United States Patent
Minoura

(10) Patent No.: US 9,239,421 B2
(45) Date of Patent: Jan. 19, 2016

(54) ILLUMINATING DEVICE AND DISPLAY DEVICE PROVIDED WITH SAME

(75) Inventor: Kazunori Minoura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 167 days.

(21) Appl. No.: 14/005,736

(22) PCT Filed: Mar. 23, 2012

(86) PCT No.: PCT/JP2012/057472
§ 371 (c)(1),
(2), (4) Date: Sep. 17, 2013

(87) PCT Pub. No.: WO2012/133160
PCT Pub. Date: Oct. 4, 2012

(65) Prior Publication Data
US 2014/0016349 A1    Jan. 16, 2014

(30) Foreign Application Priority Data
Mar. 30, 2011 (JP) .................... 2011-074163

(51) Int. Cl.
*G02B 6/42* (2006.01)
*G02F 1/13357* (2006.01)
*F21V 8/00* (2006.01)
*G02F 1/1335* (2006.01)
*G02F 1/1333* (2006.01)

(52) U.S. Cl.
CPC ............ *G02B 6/0051* (2013.01); *G02B 6/0028* (2013.01); *G02B 6/0068* (2013.01); *G02B 6/0073* (2013.01); *G02F 1/133615* (2013.01); *G02F 2001/133325* (2013.01)

(58) Field of Classification Search
CPC .. G02B 6/0025; G02B 6/0028; G02B 6/0051; G02B 6/0053; G02B 6/0068; G02B 6/0073; G02B 6/0081; G02B 6/0083; G02F 1/133325; G02F 1/133615
See application file for complete search history.

(56) References Cited

U.S. PATENT DOCUMENTS

| | | | |
|---|---|---|---|
| 8,400,580 B2* | 3/2013 | Park | 349/64 |
| 8,411,229 B2* | 4/2013 | Choo et al. | 349/64 |
| 8,441,597 B2* | 5/2013 | Kim | 349/64 |

(Continued)

FOREIGN PATENT DOCUMENTS

| | | |
|---|---|---|
| JP | 2006-66120 A | 3/2006 |
| JP | 2011-39252 A | 2/2011 |

OTHER PUBLICATIONS

Ide, Katsuya, JP2006-66120A, English machine translation, "Light Source Device, Electro-Optical Device, and Electronic Apparatus", Translated Jun. 11, 2015, pp. 1-32.*

*Primary Examiner* — Alan Cariaso
(74) *Attorney, Agent, or Firm* — Chen Yoshimura LLP

(57) ABSTRACT

The present invention allows light leaked to outside of a light guide plate (50) from a surface area L to pass through a diffusion sheet (70) by covering both the bottom of an optical sheet (75) and the surface area L of the light guide plate (50) located between an LED FPC (25) and the optical sheet (75) with the diffusion sheet (70). This irradiates a liquid crystal display panel (30) with light after the light leaked to outside from the surface area L is diffused by the diffusion sheet (70), so unevenness in the brightness of backlight emitted from a backlight device (240) can be reduced. Thus, the brightness of images displayed on a screen can be made uniform regardless of distance to an LED (60).

4 Claims, 16 Drawing Sheets

(56) References Cited

U.S. PATENT DOCUMENTS 8,681,292 B2 * 3/2014 Kim .............................. 349/64
8,864,361 B2 * 10/2014 Motooka .............. G02B 6/0013
　　　　　　　　　　　　　　　　　　　349/64

2010/0165232 A1 * 7/2010 Park et al. ...................... 349/58
2011/0032451 A1　　2/2011 Shibata et al.
2012/0002437 A1 * 1/2012 Yabe .................... G02B 6/0028
　　　　　　　　　　　　　　　　　　　362/606

* cited by examiner

ILLUMINATING DEVICE AND DISPLAY DEVICE PROVIDED WITH SAME

TECHNICAL FIELD

The present invention relates to an illumination device and a display device provided therewith, and in particular relates to an illumination device using a light-emitting diode as a light source and a display device provided therewith.

BACKGROUND ART

Light-emitting diodes (LEDs) with low power consumption have recently been replacing conventional cold cathode fluorescent lamps (CCFLs) as light sources for the backlight device (also called "illumination device") included in liquid crystal display devices. In backlight devices that use LEDs as the light source, a plurality of LEDs are arranged in a row with spaces therebetween on an end of a light guide plate. In liquid crystal display devices that include such a backlight device, images displayed on areas close to the LEDs become brighter, and images displayed on areas far from the LEDs become darker. As such, the attachment position of the LEDs leads to differences in brightness of the backlight radiated from the backlight device, resulting in unevenness in the brightness of the images displayed.

To reduce this kind of unevenness in the brightness of images, disclosed in Patent Document 1 is a light guide plate that has cut-out parts provided on a diffusion sheet attached to the surface of a light guide plate. FIG. 16 is a plan view showing the main parts of a liquid crystal display device 500 disclosed in Patent Document 1. As shown in FIG. 16, a plurality of LEDs 560 are affixed to an edge of a light guide plate 550 included in a liquid crystal display device 500. A diffusion sheet 570 and a prism sheet (an optical sheet) 575 are attached in this order to the surface of the light guide plate 550. Spheroid cut-out parts 570a are provided on the diffusion sheet 570 in positions corresponding to the respective LEDs 560 on a side thereof adjacent to the respective LED 560. Light emitted from the LEDs 560 is diffused by the cut-out parts 570a, and progresses and spreads uniformly through the light guide plate 550. This reduces unevenness in the brightness of the backlight.

RELATED ART DOCUMENT

Patent Document

Patent Document 1: Japanese Patent Application Laid-Open Publication No. 2011-39252

SUMMARY OF THE INVENTION

Problems to be Solved by the Invention

However, according to the method disclosed in Patent Document 1, the diffusion sheet 570 is made larger to accommodate the cut-out parts 570a, and thus the frame of the liquid crystal display panel will be correspondingly bigger. It is also necessary to add a step for forming the cut-out parts 570a in the manufacturing process of the diffusion sheet 570, so the manufacturing cost of the diffusion sheet 570 becomes more expensive.

The present invention aims at providing an illumination device in which it is possible to reduce unevenness in the brightness and the size of the frame, and a display device provided therewith.

Means for Solving the Problems

A first aspect of the present invention is an illumination device using a light emitted by a light-emitting diode as a light source, including:
a light guide plate that diffuses the light;
a plurality of light-emitting diodes attached to an end of the light guide plate with spaces between the light-emitting diodes;
a flexible printed circuit substrate that covers a portion of the light guide plate from an end of the light guide plate;
an optical sheet that covers the light guide plate from another end of the light guide plate to a location opposing the flexible printed circuit substrate across a space between the optical sheet and the flexible printed circuit substrate; and
a diffusion sheet placed either above or below the optical sheet,
wherein a surface area of the light guide plate between an end of the flexible printed circuit substrate and an end of the optical sheet is covered by the diffusion sheet.

A second aspect of the present invention is the first aspect of the present invention,
wherein the diffusion sheet is placed below the optical sheet, and
wherein the diffusion sheet extends from a surface of the light guide plate below the optical sheet to a surface of the light guide plate below the flexible printed circuit substrate, while covering the surface area.

A third aspect of the present invention is the first aspect of the present invention,
wherein the diffusion sheet is placed below the optical sheet, and
wherein the diffusion sheet extends from an end of the optical sheet to above the flexible printed circuit substrate, while covering the surface area at a slant.

A fourth aspect of the present invention is the first aspect of the present invention,
wherein the diffusion sheet is placed above the optical sheet, and
wherein the diffusion sheet extends from above the optical sheet to above the flexible printed circuit substrate, while covering the surface area.

A fifth aspect of the present invention is a display device provided with the illumination device according to any one of aspects 1 to 4 of the present invention.

Effects of the Invention

According to the first aspect of the present invention, unevenness in the brightness of the light emitted from the illumination device is reduced, so the images displayed on the screen are uniform regardless of distance from the light-emitting diodes. It is also not necessary to provide cut-out parts on the diffusion sheet, so the manufacturing cost of a display device that uses such a diffusion sheet is also reduced.

The second aspect of the present invention has similar effects to the first aspect of the present invention.

The third aspect of the present invention has similar effects to the first aspect of the present invention.

The fourth aspect of the present invention has similar effects to the first aspect of the present invention. Light emitted from the light guide plate passes through the diffusion sheet right before being radiated on the rear of the display panel, and thus the light is radiated on the display panel in a sufficiently diffused state. This further reduces unevenness in the brightness.

According to the fifth aspect of the present invention, it is not necessary to provide cut-out parts on the diffusion sheet, so the frame of the display panel can be made narrower.

DETAILED DESCRIPTION OF EMBODIMENTS

1. Basic Study

<1.1 Configuration of Liquid Crystal Module>

Figure 1:
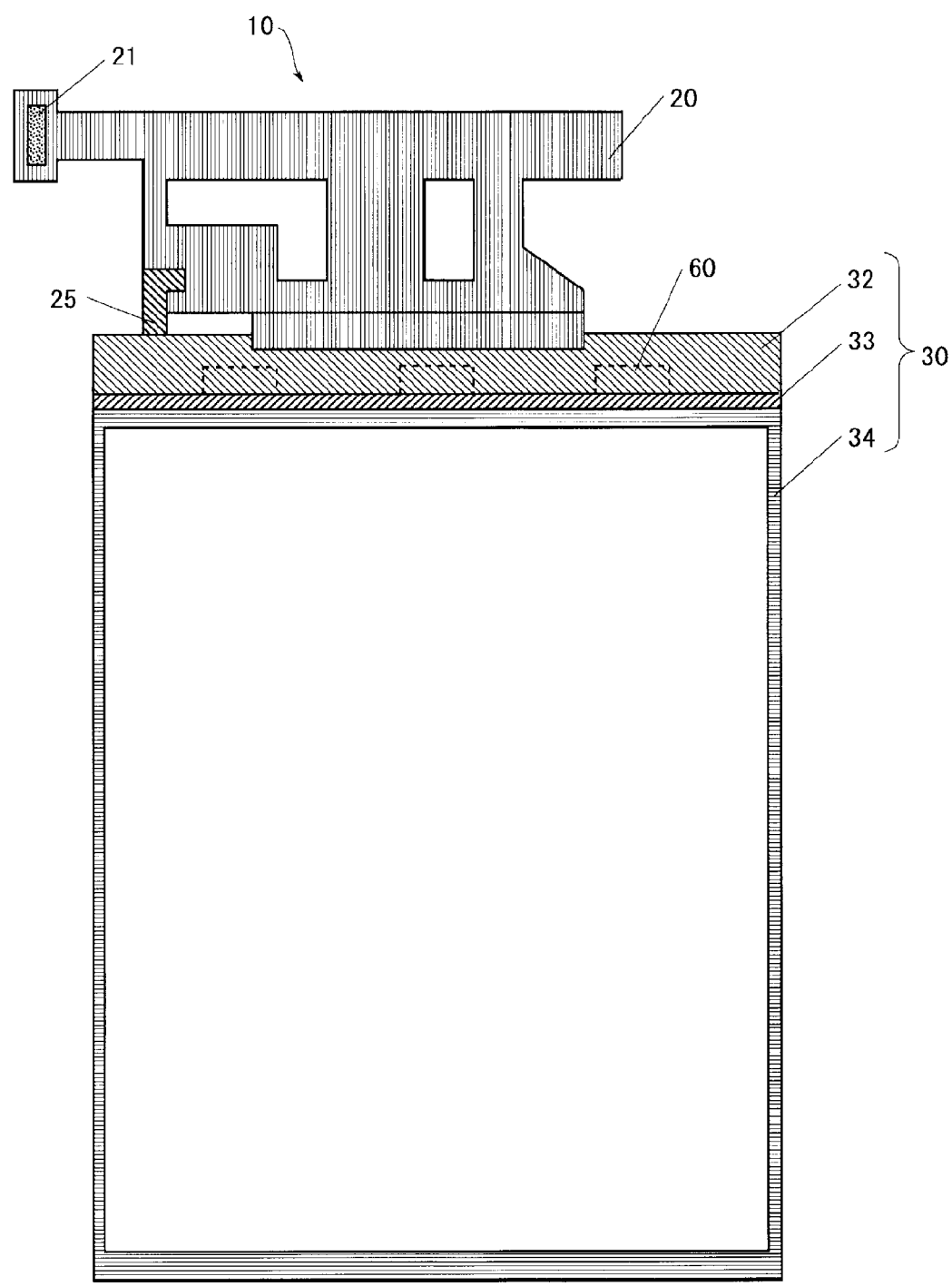
FIG. 1 is a plan view showing a liquid crystal module included in a liquid crystal display device.

A configuration of a liquid crystal module 10 included in each liquid crystal display device described below will be explained. FIG. 1 is a plan view showing the configuration of the liquid crystal module 10. As shown in FIG. 1, the liquid crystal module 10 includes a liquid crystal display panel 30, and a flexible printed circuit substrate 20 (hereinafter, "FPC 20") attached to an end portion of the liquid crystal display panel 30. The FPC 20 receives driving image signals and various types of control signals externally via a connector 21, and sends these to each pixel component (not shown) formed on the liquid crystal display panel 30. An LED FPC 25 branched off from the FPC 20 sends electrical signals to each LED 60 in order to make these LEDs 60 that are attached to an edge of the liquid crystal display panel 30 emit light. A first polarizing plate (not shown), a TFT (Thin Film Transistor) substrate 32, a CF (Color Filter) substrate 33, and a second polarizing plate 34 are disposed in this order on the liquid crystal display panel 30.

<1.2 Configuration of Liquid Crystal Display Device>

Figure 2:
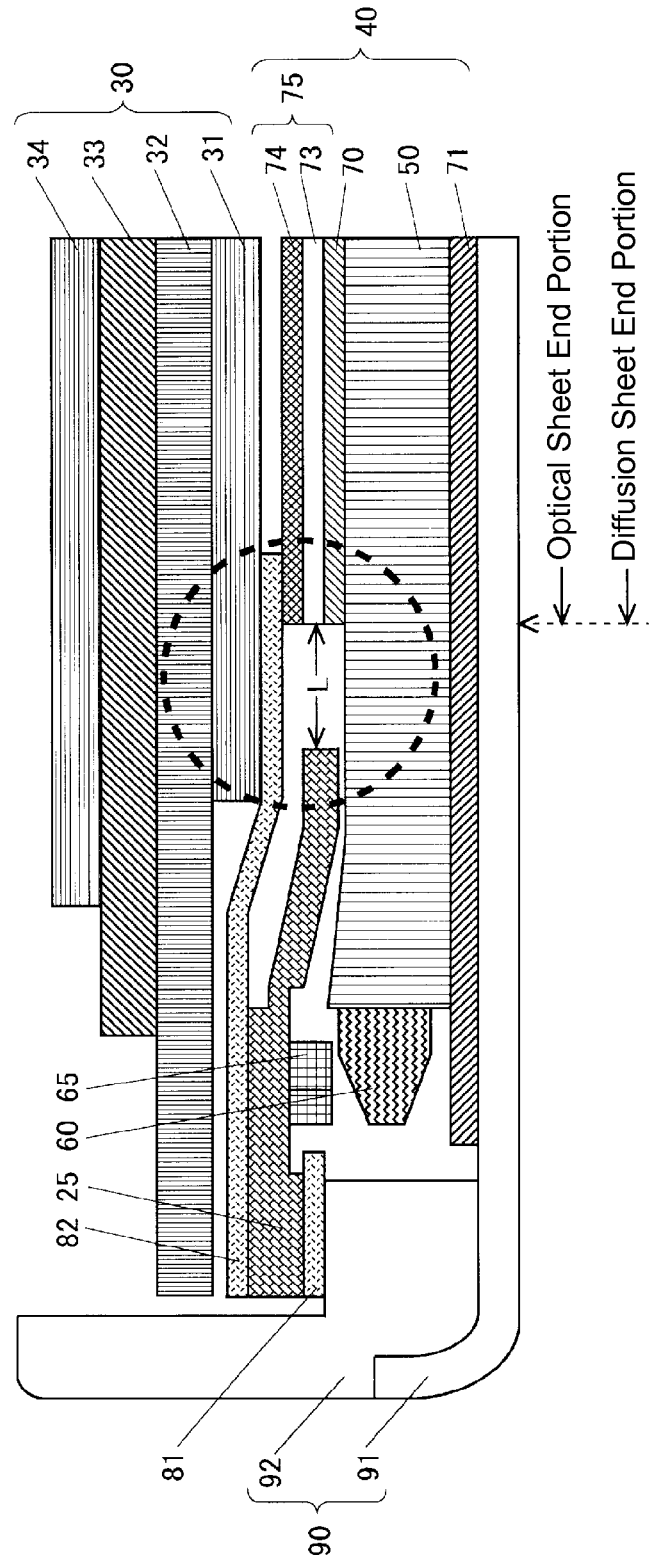
FIG. 2 is a cross-sectional view showing main parts of a liquid crystal display device used in the basic study.
Figure 3:
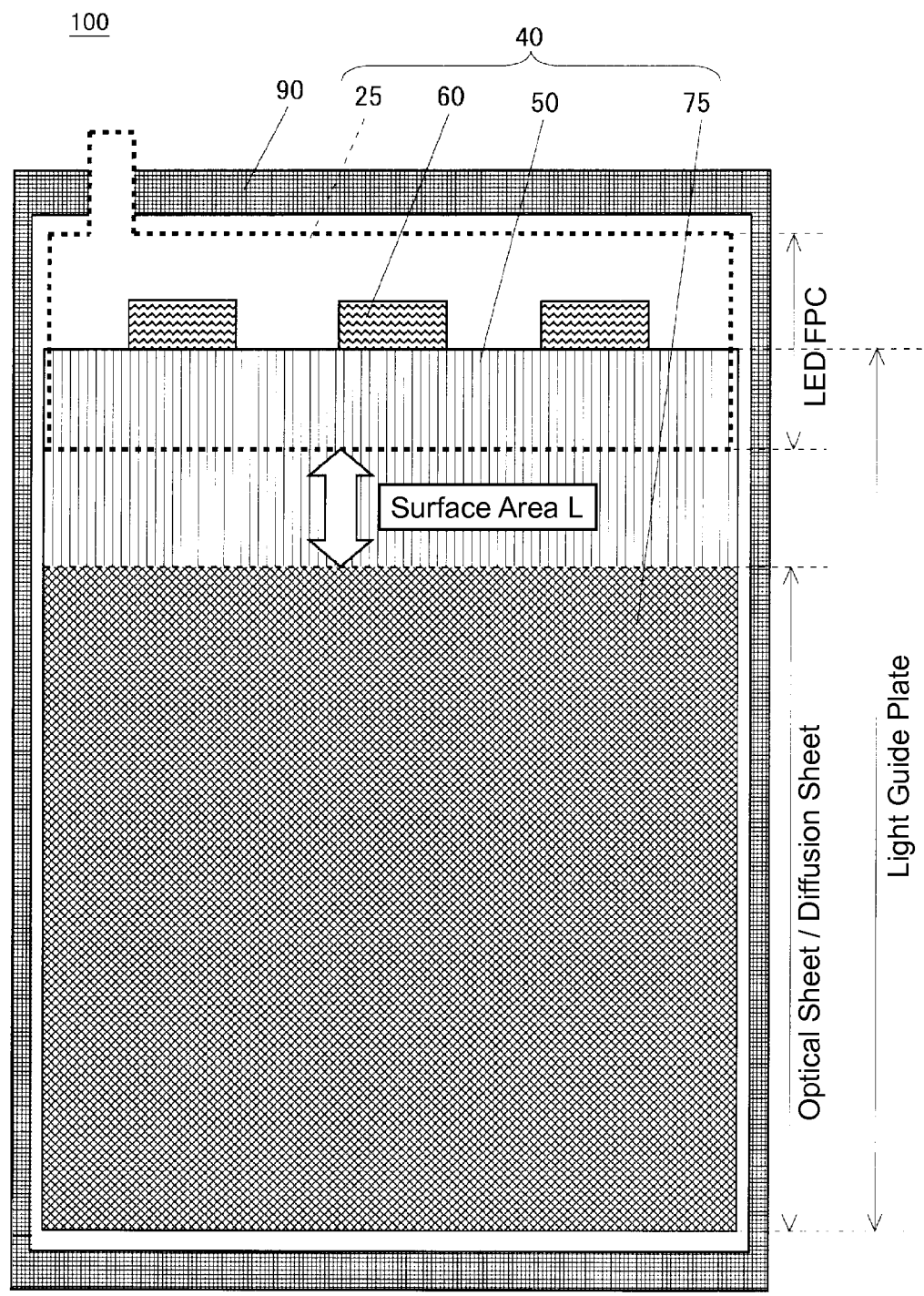
FIG. 3 is a plan view showing a configuration of the liquid crystal display device shown in FIG. 2.

FIG. 2 is a cross-sectional view showing main parts of a liquid crystal display device 100 used in the basic study, and FIG. 3 is a plan view showing a configuration of the liquid crystal display device 100 shown in FIG. 2. As shown in FIG. 2, the liquid crystal display device 100 includes a casing 90, a backlight device 40 housed inside the casing 90, and the liquid crystal display panel 30. In FIGS. 2 and 3, the FPC 20 attached to the liquid crystal display panel 30 is omitted. In FIG. 3, the liquid crystal display panel is also omitted.

The casing 90 is formed by combining a bottom plate 91, which is made of a metal sheet, with a resin frame 92 formed so as to surround the bottom plate 91. The backlight device 40 includes: a plurality of the LEDs 60 that function as light sources; the LED FPC 25 that sends electrical signals to the LEDs 60 to make the LEDs 60 emit light; and a light guide plate 50 for uniformly spreading light emitted from the LEDs 60 over the entire bottom of the liquid crystal display panel 30. In FIG. 3, in order to show the configuration of the lower side of the LED FPC 25, only the outline of the LED FPC is shown with a dotted line.

The light guide plate 50 is arranged on the bottom plate 91 of the casing 90. A reflective sheet 71 is attached to the bottom (the surface facing the bottom plate 91) of the light guide plate 50. The reflective sheet 71 reflects light that has leaked from the bottom of the light guide plate 50 and returns it back to inside the light guide plate 50. A PET (polyethylene terephthalate) sheet, a silver sheet with silver sputtered on a PET sheet, an ESR (Enhanced Specular Reflector) sheet having a polyester resin multi-layer film structure, or the like, is used for the reflective sheet 71.

An end of the light guide plate 50 close to the LEDs 60 is thicker than the other end. A plurality of the LEDs 60 are attached to the thick end of the light guide plate 50 in a row with spaces therebetween. A connection terminal 65 that sends externally received electrical signals to the LEDs 60 is provided on the LED FPC 25 for each LED 60. Thus, if the LEDs 60 are connected to the respective connection terminals 65, the externally received electrical signals will be sent to the LEDs 60, and the LEDs 60 will emit light. The LED FPC 25 needs to cover the LEDs 60, so the end of the LED FPC 25 does not just cover the LEDs 60, but also extends to above the light guide plate 50. One end of the LED FPC 25 is attached by double-sided tape 81 to a different-level part provided on the resin frame 92. This affixes the LED FPC 25 to the casing 90.

The diffusion sheet 70 is attached to the surface of the light guide plate 50 so as to cover the surface from a position ("Diffusion Sheet End Portion" shown in FIG. 2) at a prescribed distance from the edge of the light guide plate 50 where the LEDs 60 are attached to the other end of the light guide plate 50. An optical sheet 75 is attached to the surface of the diffusion sheet 70. The end portion ("Optical Sheet End Portion" shown in FIG. 2) of the optical sheet 75 is in the same location as the end portion of the diffusion sheet. The diffusion sheet 70 is a sheet for diffusing light that is heading towards the liquid crystal display panel 30 from the light guide plate 50. A sheet that is a transparent member made of a synthetic resin or the like and that has a roughened surface is used for the diffusion sheet 70. The optical sheet 75 is a prism sheet with prism rows for concentrating light forward. The optical sheet 75 shown in FIG. 2 is a two-layer sheet in which a second optical sheet 74 is layered onto a surface of a first optical sheet 73, but the sheet may also be an optical sheet with just one layer, or an optical sheet with three or more layers.

The liquid crystal display panel 30 is arranged above the backlight device 40. The liquid crystal display panel 30 includes: the first polarizing plate 31; the TFT substrate 32, whereupon thin film transistors that function as switching elements for pixel components, and the like are formed; the CF substrate 33 arranged so as to oppose the TFT substrate 32, with a liquid crystal layer (not shown) interposed therebetween; and the second polarizing plate 34 provided on a surface of the CF substrate 33. The liquid crystal display panel 30 is housed in the casing 90 with the first polarizing plate 31 side down. Thus, from the surface of the optical sheet 75 proceeding upwards, the first polarizing plate 31, the TFT substrate 32, the CF substrate 33, and the second polarizing plate 34 are disposed in this order inside the casing 90.

The liquid crystal display panel 30 is affixed to the backlight device 40 by double-sided tape 82. Specifically, the bottom of the first polarizing plate 31 is affixed to the top of the optical sheet 75 by an end of the double-sided tape 82, and the other end of the double-sided tape 82 is affixed to the top of the LED FPC 25.

Figure 4:
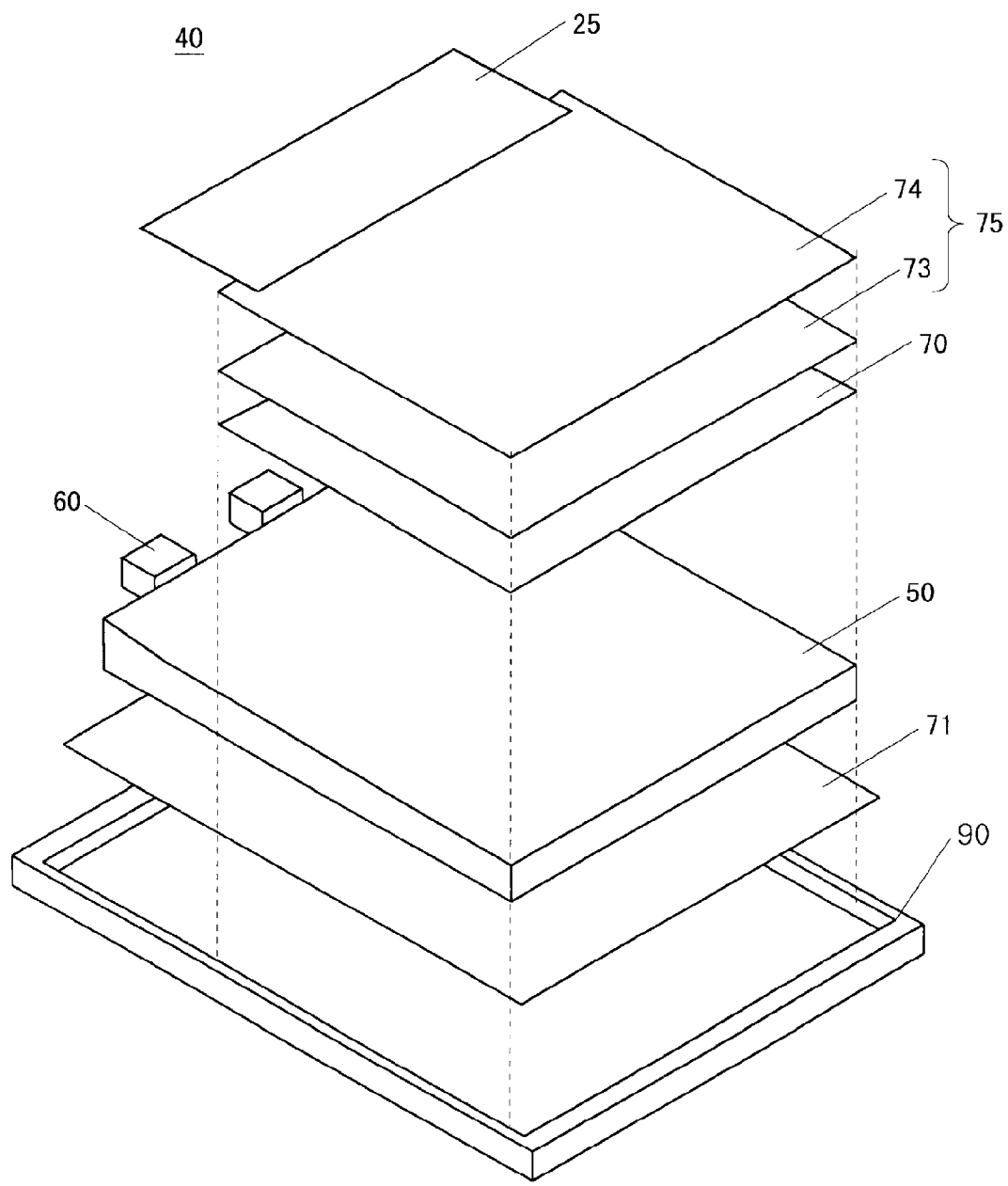
FIG. 4 is an exploded perspective view showing a configuration of a backlight device housed in a casing of the liquid crystal display device shown in FIG. 2.

FIG. 4 is an exploded perspective view showing a configuration of the backlight device 40 housed inside the casing 90. As shown in FIG. 4, the light guide plate 50 is arranged on the bottom of the casing 90. The reflective sheet 71 is affixed to the bottom of the light guide plate 50, and a plurality of the LEDs 60 are attached to the edge of the light guide plate 50. The diffusion sheet 70 and the optical sheet 75, which is the layered first optical sheet 73 and the second optical sheet 74, are layered in this order on the surface of the light guide plate 50.

When the LEDs 60 are made to emit light in such a liquid crystal display device 100, the light that the LEDs 60 emit progresses through the light guide plate 50, and passes from the surface of the light guide plate 50 through the diffusion sheet 70 and optical sheet 75 to irradiate the liquid crystal display panel 30 with light. This causes an image to be displayed on the screen of the liquid crystal display device 100.

<1.3 Uneven Brightness>

Figure 5:
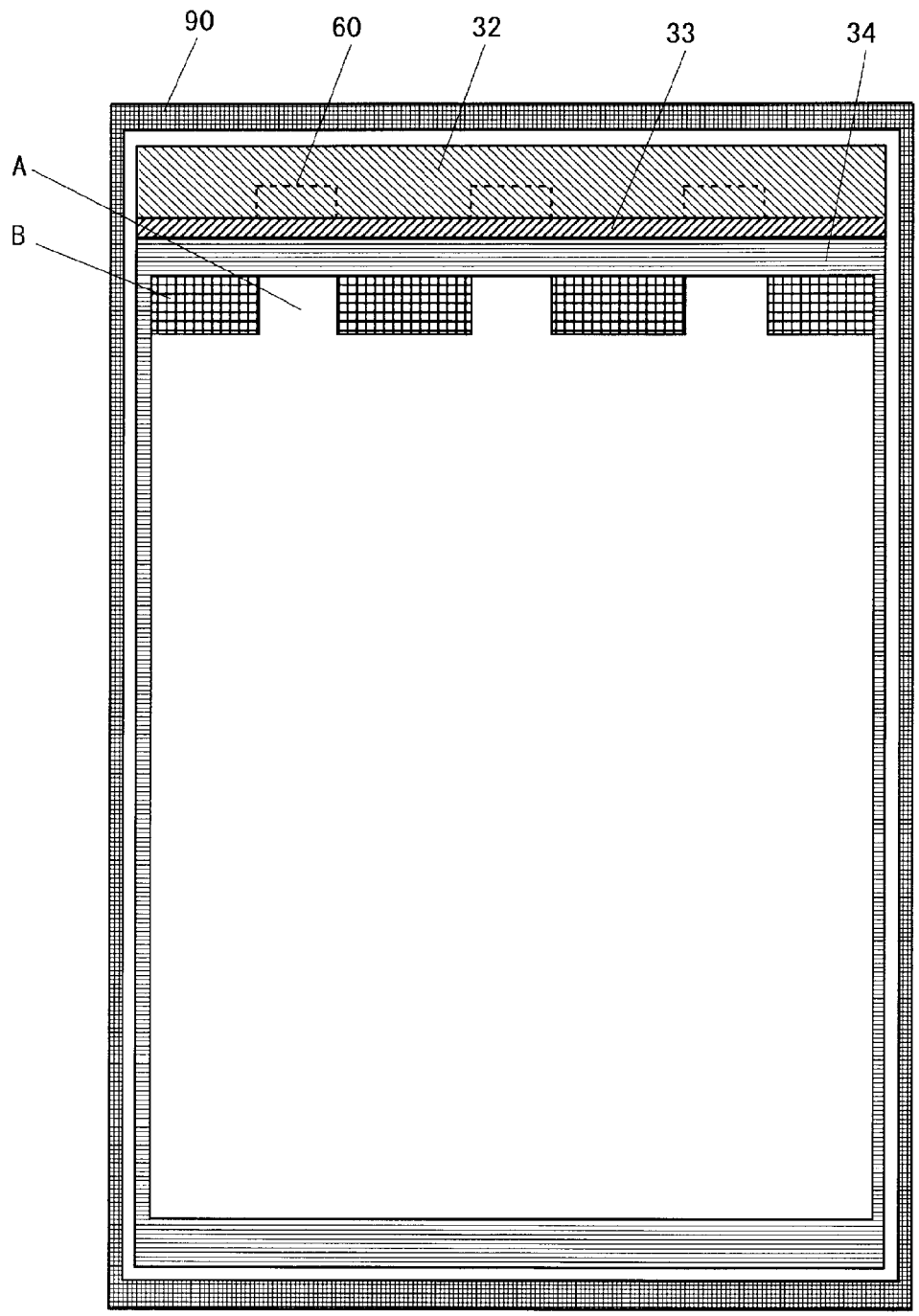
FIG. 5 is a view showing brightness of an image when the image is displayed on a screen of the liquid crystal display device shown in FIG. 2.

FIG. 5 is a view showing the brightness of an image displayed on the screen of the liquid crystal display device 100 shown in FIGS. 2 and 3. Unevenness in the brightness occurs in the backlight emitted from the backlight device 40 in the liquid crystal display device 100. As shown in FIG. 5, images displayed on areas A close to the LEDs become brighter, and images displayed on areas B far from the LEDs become darker.

Figure 6:
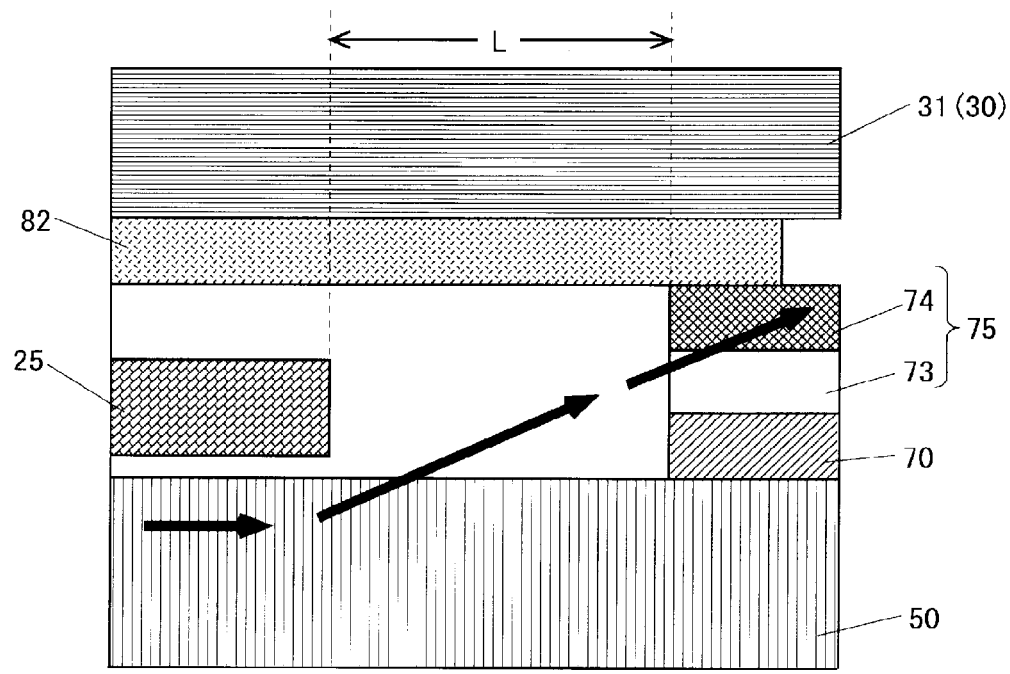
FIG. 6 is an enlarged view of a part of the liquid crystal display device shown in FIG. 2.

The reason such unevenness in the brightness occurs with the backlight in the liquid crystal display device 100 will be explained below. FIG. 6 is an enlarged view of one part (inside the dotted circle) of the liquid crystal display device 100 shown in FIG. 2. As shown in FIG. 6, there is an area L (hereinafter, the "surface area L") with a prescribed width on the surface of the light guide plate 50 and located between the LED FPC 25, which extends from one side thereof (the left side in FIG. 6), and the optical sheet 75, which extends from the other side (the right side in FIG. 6). This surface area L is not covered by the LED FPC 25, the optical sheet 75, or the diffusion sheet 70.

The light that the LEDs 60 attached to one end of the light guide plate 50 emit progresses through the light guide plate 50, and some of this light leaks to outside of the light guide plate 50 from the surface area L. Since the surface area L is not covered by the diffusion sheet 70, the light leaked to outside from the surface area L progresses straight without being diffused, and irradiates the liquid crystal display panel 30 (in FIG. 6, only the first polarizing plate 31 is shown) with light. This causes unevenness in the brightness of the backlight emitted from the backlight device 40 in the liquid crystal display device 100. Therefore, images displayed on areas A close to the LEDs become brighter, and images displayed on areas B far from the LEDs become darker.

If the surface area L of the light guide plate 50 is also covered with the diffusion sheet 70 in order to pass the light leaked to outside of the light guide plate 50 from the surface area L through the diffusion sheet 70, then the light leaked to outside from the surface area L will irradiate the liquid crystal display panel 30 after being diffused by the diffusion sheet 70. This reduces unevenness in the brightness of the backlight emitted from the backlight device 40, so the brightness of images displayed on the screen can be made uniform regardless of distance from the LEDs 60.

2. Embodiment 1

A configuration of a liquid crystal module included in a liquid crystal display device 200 of Embodiment 1 is the same as the configuration of the liquid crystal module 10 in FIG. 1, so the drawings and explanations showing a configuration of the liquid crystal module will be omitted.

<2.1 Configuration of Liquid Crystal Display Device>

Figure 7:
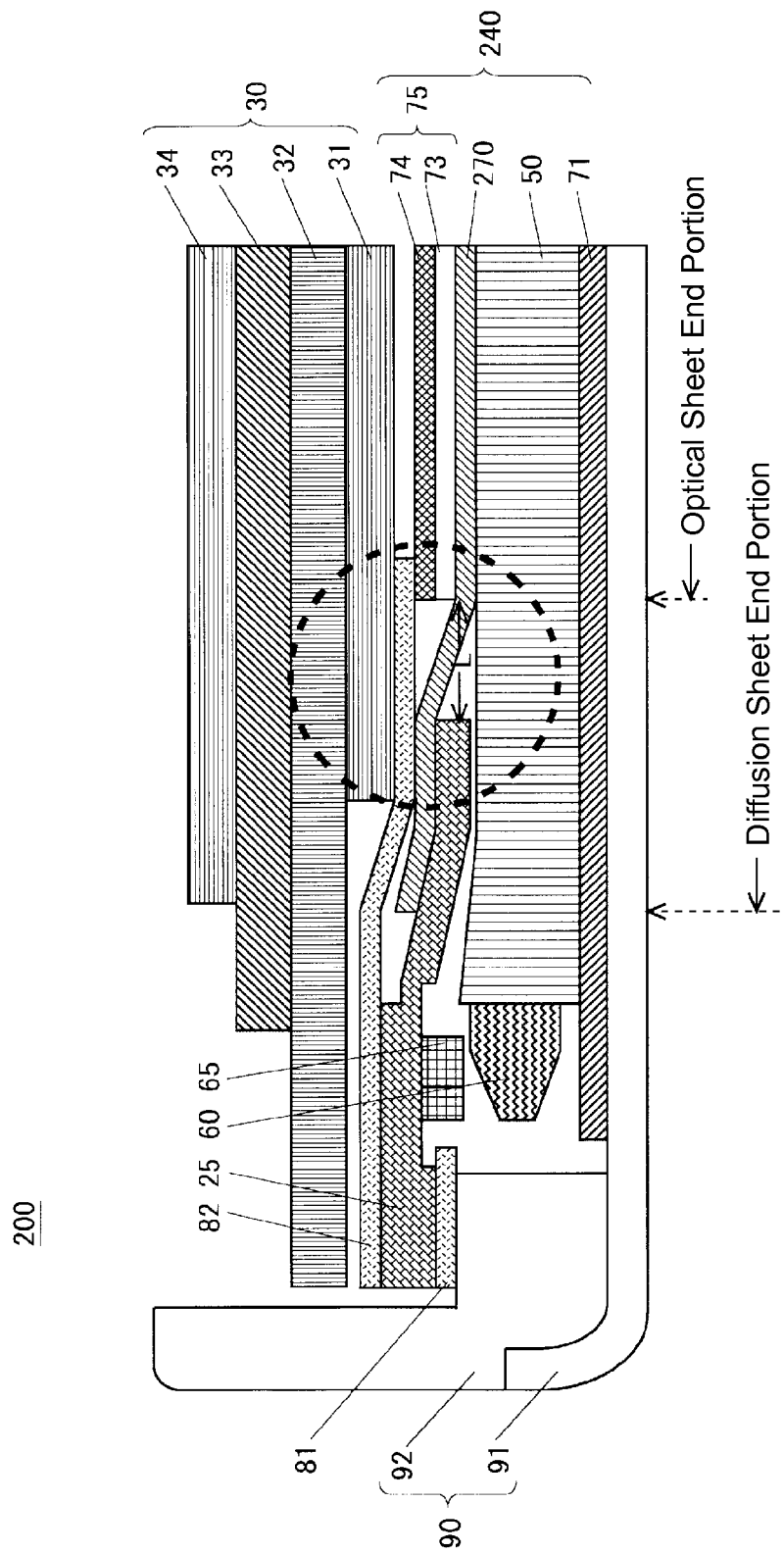
FIG. 7 is a cross-sectional view showing main parts of a liquid crystal display device according to Embodiment 1.
Figure 8:
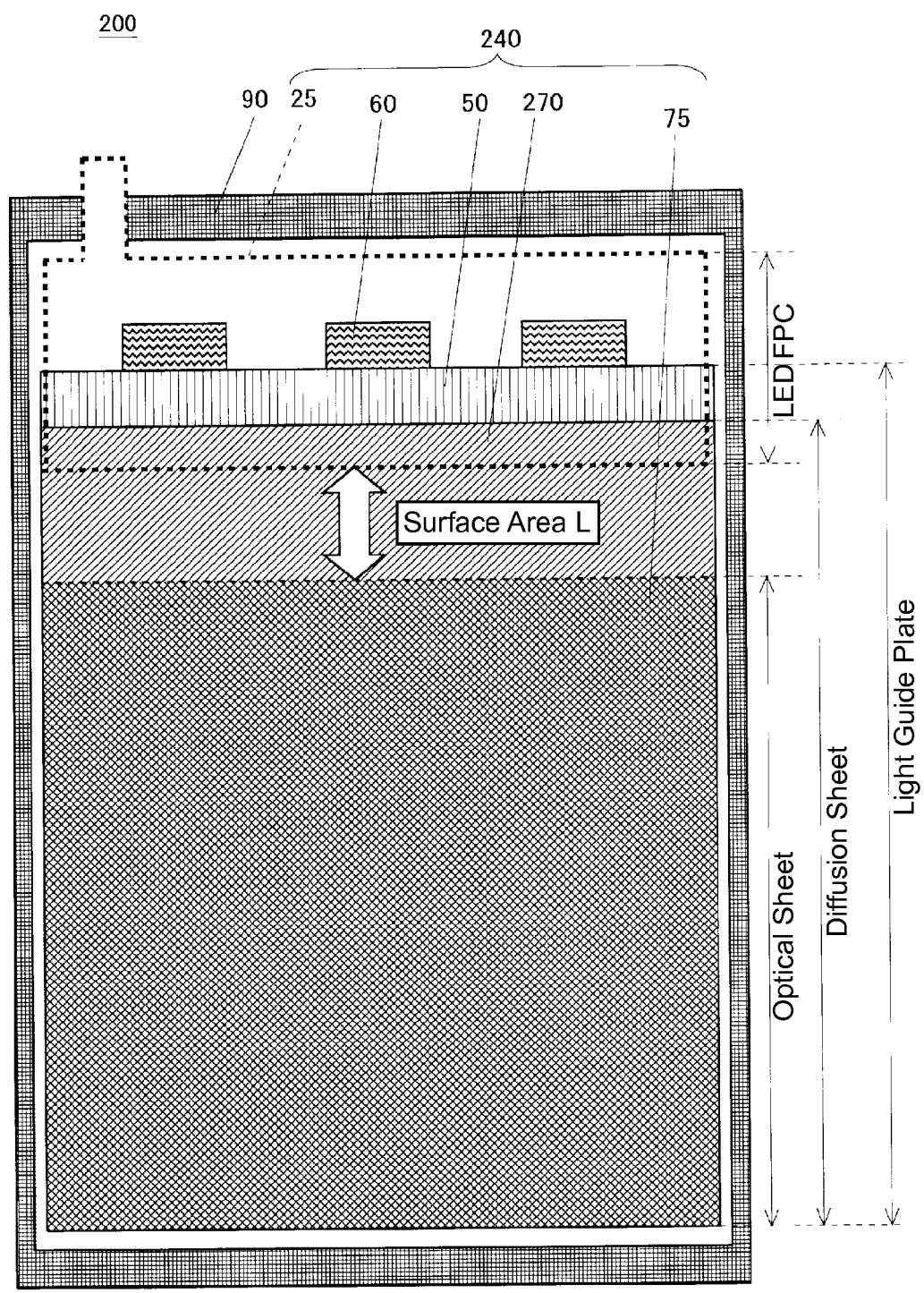
FIG. 8 is a plan view showing a configuration of the liquid crystal display device shown in FIG. 7.

FIG. 7 is a cross-sectional view showing main parts of the liquid crystal display device 200 of Embodiment 1, and FIG. 8 is a plan view showing a configuration of the liquid crystal display device 200 shown in FIG. 7. The components shown in FIGS. 7 and 8 that are the same as those shown in FIGS. 2 and 3 are given the same reference characters and the explanation thereof will be omitted. Only the components that are different will be explained.

As shown in FIGS. 7 and 8, a backlight device 240 of the liquid crystal display device 200 differs from the backlight device 40 of the liquid crystal display device 100 in that an end portion of a diffusion sheet 270 is in a location different than the end portion of an optical sheet 75. Specifically, the diffusion sheet 270 covers a surface area L beyond the end portion of the optical sheet 75 and extends to above an LED FPC 25, the end of the diffusion sheet 270 being affixed to the LED FPC 25 with double-sided tape 82. As such, in the liquid crystal display device 200, the diffusion sheet 270 is provided on the surface of a light guide plate 50 having the optical sheet 75 thereover, and from the end portion of the optical sheet 75 the diffusion sheet 270 extends upward at a slant above the LED FPC 25. By doing this, the surface area L of the light guide plate 50 is covered at a slant by the diffusion sheet 270.

<2.2 Uneven Brightness>

Figure 9:
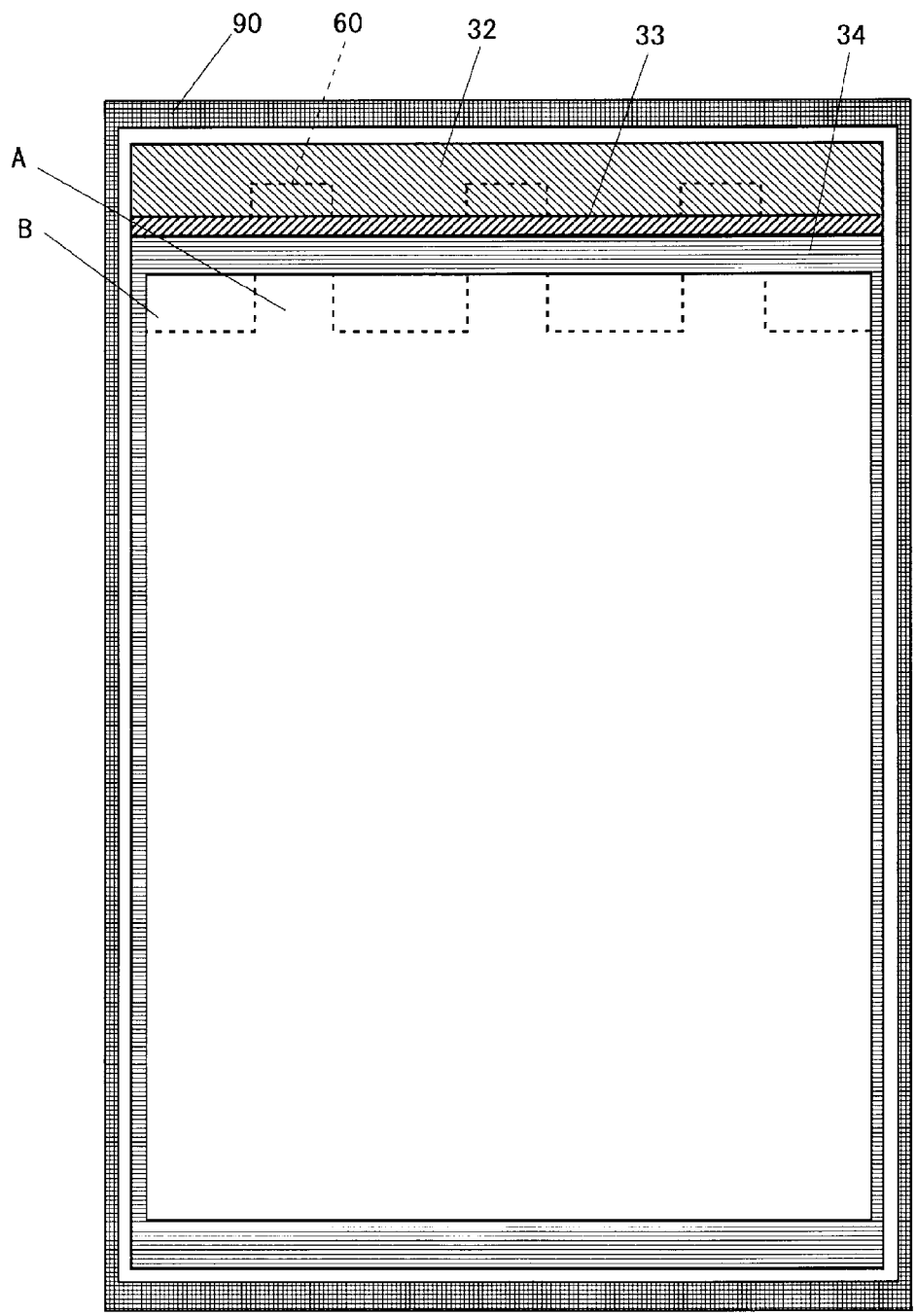
FIG. 9 is a view showing brightness of an image when the image is displayed on a screen of the liquid crystal display device shown in FIG. 7.

FIG. 9 is a view showing brightness of an image when the image is displayed on a screen of the liquid crystal display device 200 shown in FIG. 7. Unlike in FIG. 5, images displayed to areas B far from LEDs 60 have the same brightness as images displayed to areas A close to the LEDs 60. This shows that unevenness in the brightness of backlight emitted from the backlight device 240 has been reduced in the liquid crystal display device 200.

Figure 10:
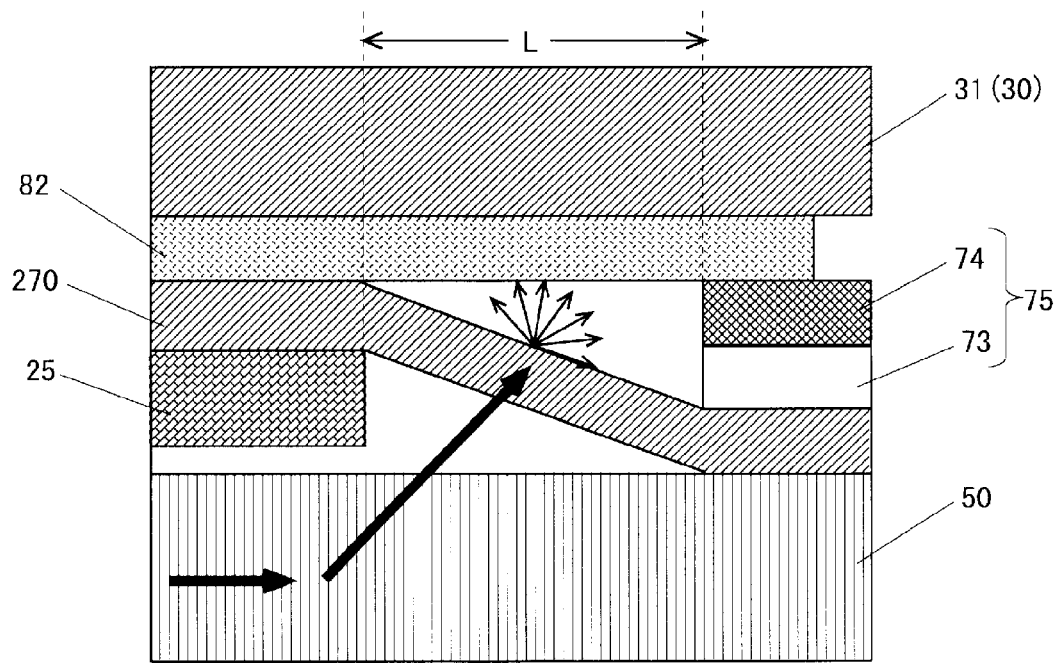
FIG. 10 is an enlarged view of a part of the liquid crystal display device shown in FIG. 7.

Next, the reason that unevenness in the brightness of the backlight is reduced will be explained. FIG. 10 is an enlarged view of one part (inside the dotted circle) of the liquid crystal display device 200 shown in FIG. 7. As shown in FIG. 10, the surface area L of the light guide plate 50 between the LED FPC 25 and the optical sheet 75 is covered at a slant by the diffusion sheet 270, so the light that leaks outside of the light guide plate 50 from the surface area L irradiates the liquid crystal display panel 30 after being diffused by the diffusion sheet 270. This reduces the unevenness in the brightness of the backlight emitted from the backlight device 240. Therefore, the brightness of images displayed on the screen can be made uniform regardless of distance from the LEDs 60.

<2.3 Effects>

According to the present embodiment, unevenness in the brightness of the backlight emitted from the backlight device 240 is reduced, so the brightness of images displayed on the screen can be made uniform regardless of distance from the LEDs 60. It is also not necessary to provide cut-out parts on the diffusion sheet 270, so the frame of the liquid crystal display panel 30 can be made narrower and the manufacturing cost can be reduced.

3. Embodiment 2

A configuration of a liquid crystal module included in a liquid crystal display device 300 of Embodiment 2 is the same as the configuration of the liquid crystal module 10 in FIG. 1, so the drawings and explanations showing a configuration of the liquid crystal module will be omitted.

<3.1 Configuration of Liquid Crystal Display Device>

Figure 11:
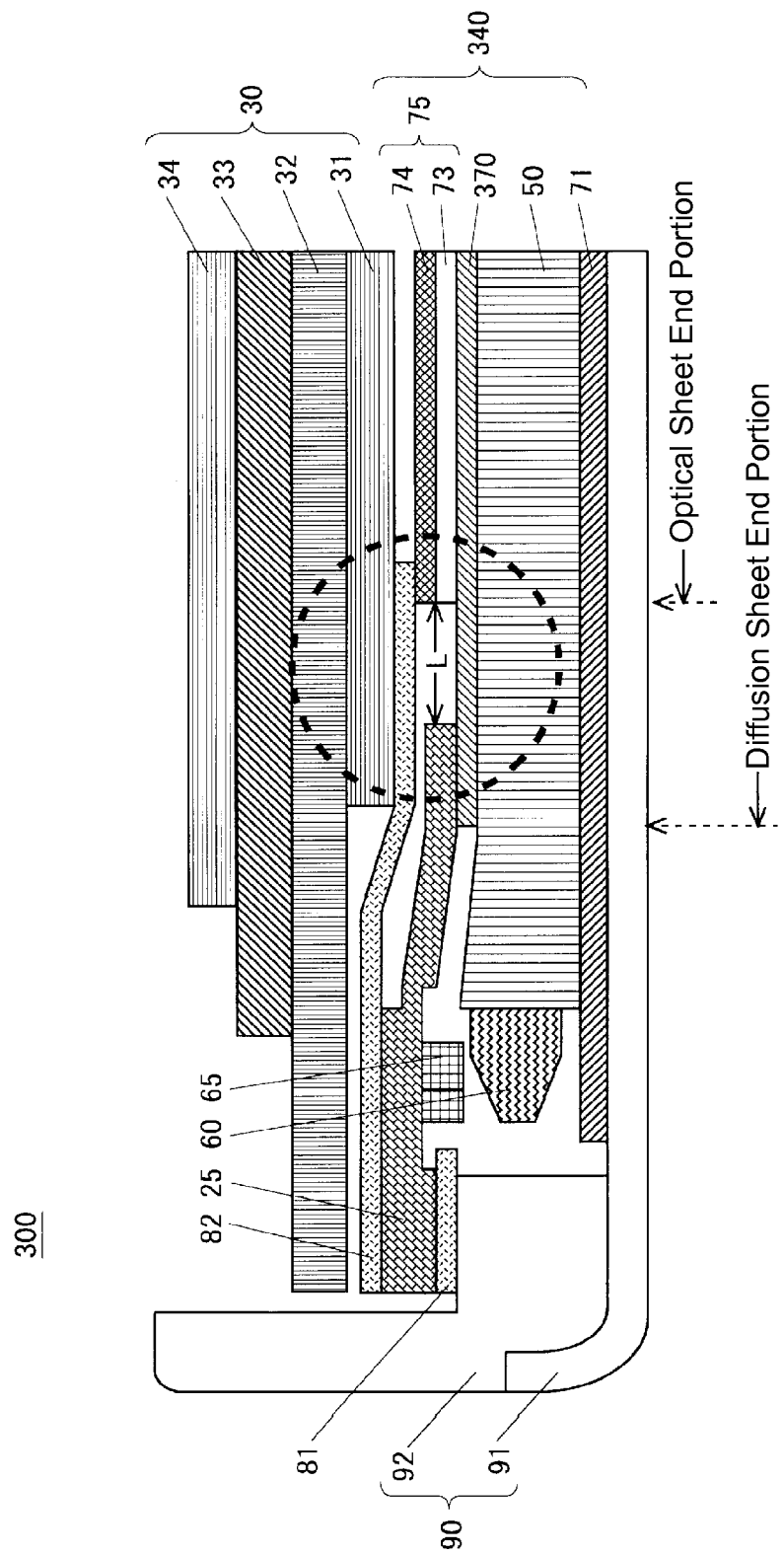
FIG. 11 is a cross-sectional view showing main parts of a liquid crystal display device according to Embodiment 2.

FIG. 11 is a cross-sectional view of main parts of the liquid crystal display device 300 according to Embodiment 2. The components shown in FIG. 11 that are the same as those shown in FIG. 2 are given the same reference characters and the explanation thereof will be omitted. Only the components that are different will be explained. The plan view showing a configuration of the liquid crystal display device 300 shown in FIG. 11 is the same as the plan view shown in FIG. 8, and thus will be omitted.

As shown in FIG. 11, a backlight device 340 of the liquid crystal display device 300 differs from the backlight device 40 of the liquid crystal display device 100 in that an end portion of a diffusion sheet 370 is in a location different than an end portion of an optical sheet 75. Specifically, the diffusion sheet 370 covers a surface area L from the end portion of the optical sheet 75 along the surface of a light guide plate 50, and further extends below an LED FPC 25. This diffusion sheet 370 is attached to the surface of the light guide plate 50, not just under the optical sheet 75, but also in the bottom part of the surface area L and under the LED FPC 25.

<3.2 Uneven Brightness>

The brightness of images when the images are displayed on the screen of the liquid crystal display device 300 is the same as in the liquid crystal display device 200 shown in FIG. 9. Therefore, diagrams showing the brightness of images when the images are displayed on the screen of the liquid crystal display device 300 and explanations thereof will be omitted.

Figure 12:
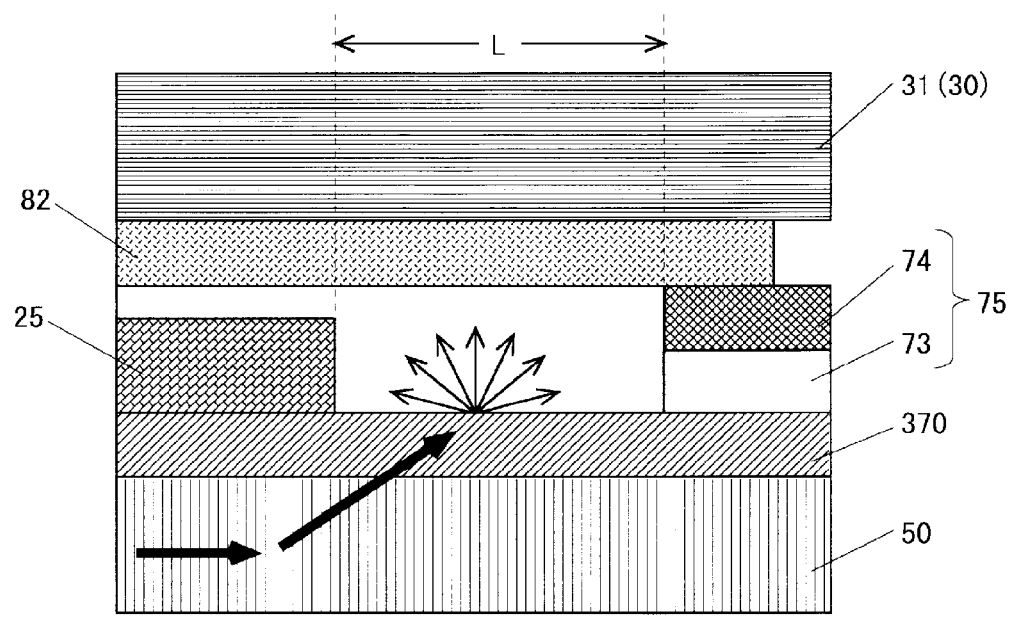
FIG. 12 is an enlarged view of a part of the liquid crystal display device shown in FIG. 11.

Next, the reason that unevenness in the brightness of the backlight is reduced will be explained. FIG. 12 is an enlarged view of one part (inside the dotted circle) of the liquid crystal display device 300 shown in FIG. 11. As shown in FIG. 12, the surface area L of the light guide plate 50 between the LED FPC 25 and the optical sheet 75 is covered by the diffusion sheet 370 attached to the surface of the light guide plate 50. Therefore, light that leaks to outside of the light guide plate 50 from the surface area L is irradiated on the liquid crystal display panel 30 after being diffused by the diffusion sheet 370. As a result, unevenness in the brightness of the backlight emitted from the backlight device 340 is reduced, so the brightness of images displayed on the screen can be made uniform regardless of distance from the LEDs 60.

<3.3 Effects>

The present embodiment has similar effects to Embodiment 1, so an explanation thereof will be omitted.

4. Embodiment 3

A configuration of a liquid crystal module included in a liquid crystal display device 400 of Embodiment 3 is the same as the configuration of the liquid crystal module 10 in FIG. 1, so the drawings and explanations showing the liquid crystal module will be omitted.

<4.1 Configuration of Liquid Crystal Display Device>

Figure 13:
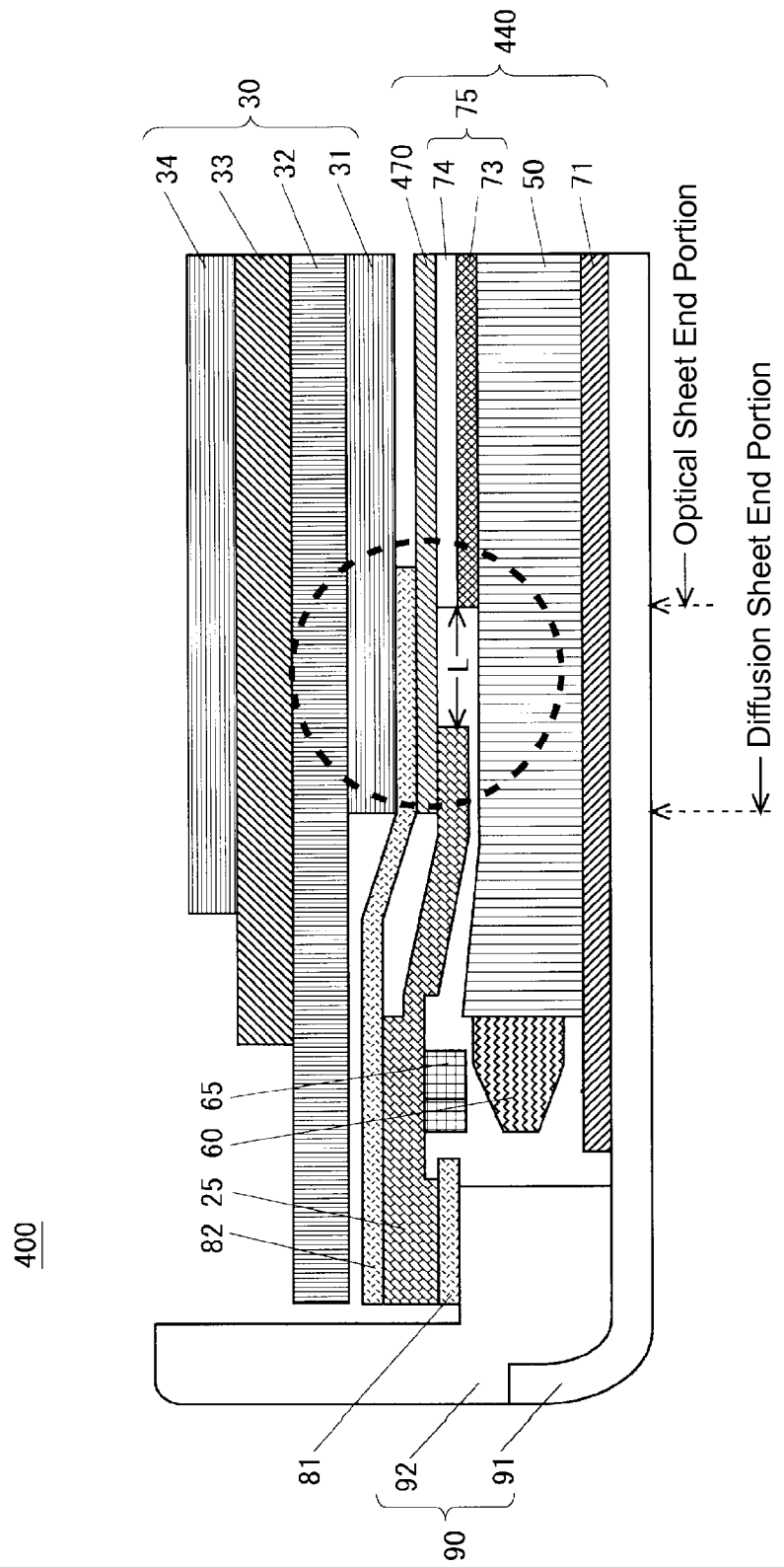
FIG. 13 is a cross-sectional view showing main parts of a liquid crystal display device according to Embodiment 3.
Figure 14:
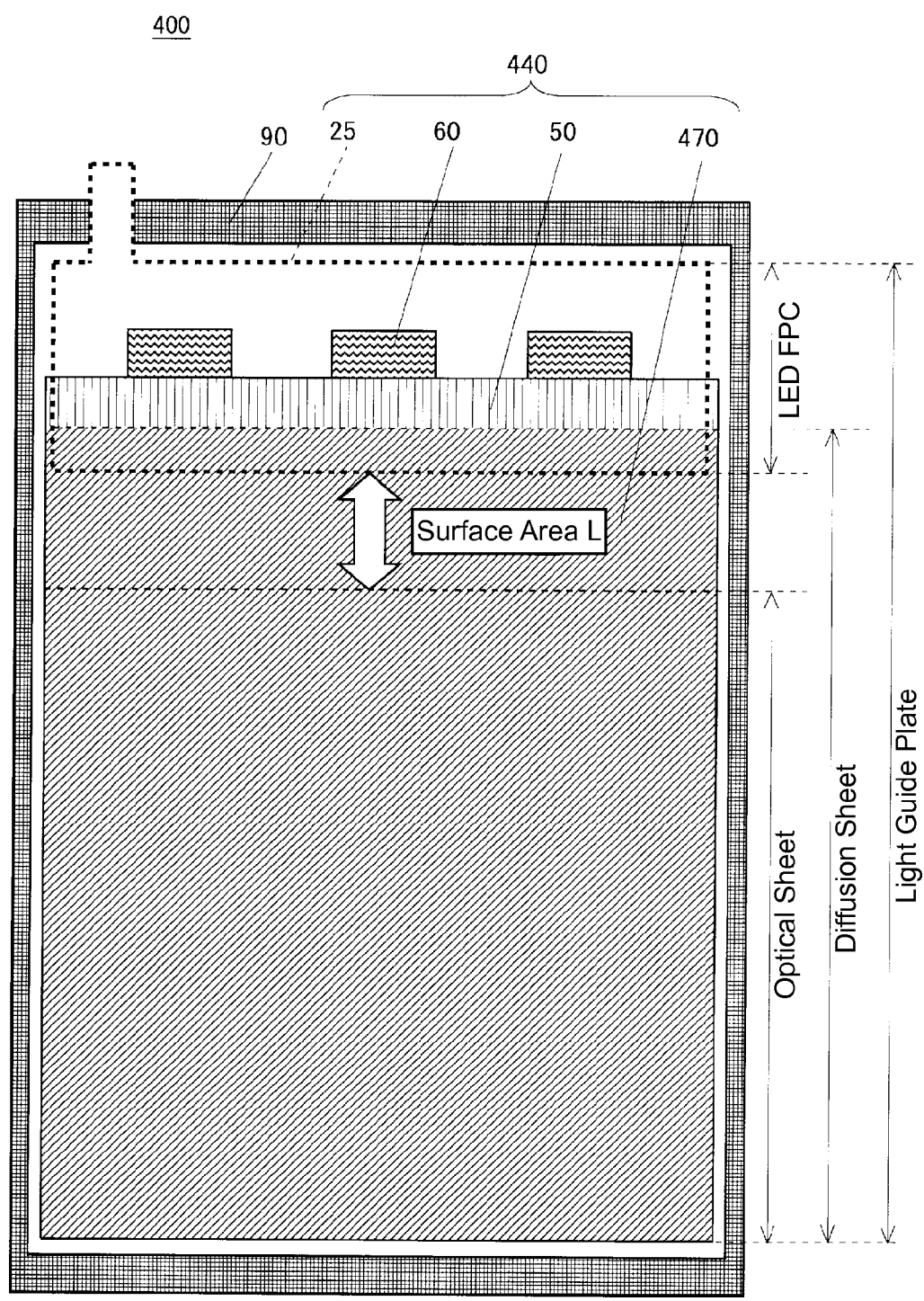
FIG. 14 is a plan view showing a configuration of the liquid crystal display device shown in FIG. 13.

FIG. 13 is a cross-sectional view showing main parts of the liquid crystal display device 400 of Embodiment 3, and FIG. 14 is a plan view showing a configuration of the liquid crystal display device 400 shown in FIG. 13. The components shown in FIGS. 13 and 14 that are the same as those shown in FIGS. 2 and 3 are given the same reference characters and the explanation thereof will be omitted. Only the components that are different will be explained.

A backlight device 440 of the liquid crystal display device 400 differs from the liquid crystal display device 100 shown in FIG. 2 in that an optical sheet 75 is attached to the surface of a light guide plate 50, and a diffusion sheet 470 is attached on the surface of the optical sheet 75. An end portion of the diffusion sheet 470 is also in a different location than an end portion of the optical sheet 75. Specifically, the diffusion sheet 470 covers a surface area L beyond the end portion of the optical sheet 75 and extends to above an LED FPC 25, the end portion of the diffusion sheet 470 being affixed to the surface of the LED FPC 25 with double-sided tape 82. As such, the diffusion sheet 470 covers the surface area L from above the optical sheet 75 and extends to above the LED FPC 25, and thus is as far up in the surface area L as the optical sheet 75 is thick.

<4.2 Uneven Brightness>

The brightness of images when the images are displayed on the screen of the liquid crystal display device 400 is the same as in the liquid crystal display device 200 in Embodiment 1. Therefore, diagrams showing the brightness of images when the images are displayed on the screen of the liquid crystal display device 400 and explanations thereof will be omitted.

Figure 15:
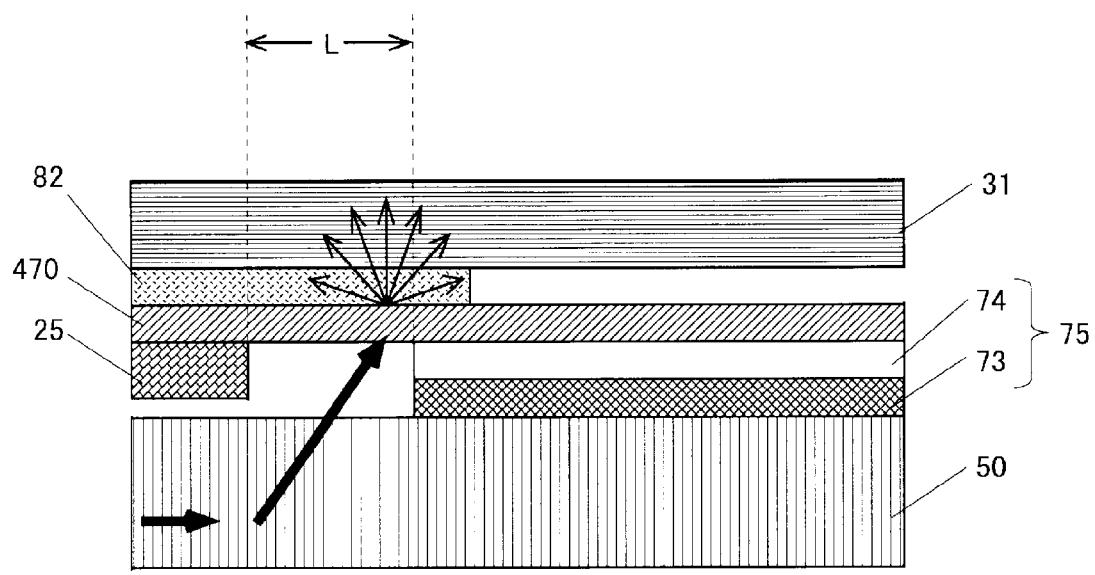
FIG. 15 is an enlarged view of a part of the liquid crystal display device shown in FIG. 13.
Figure 16:
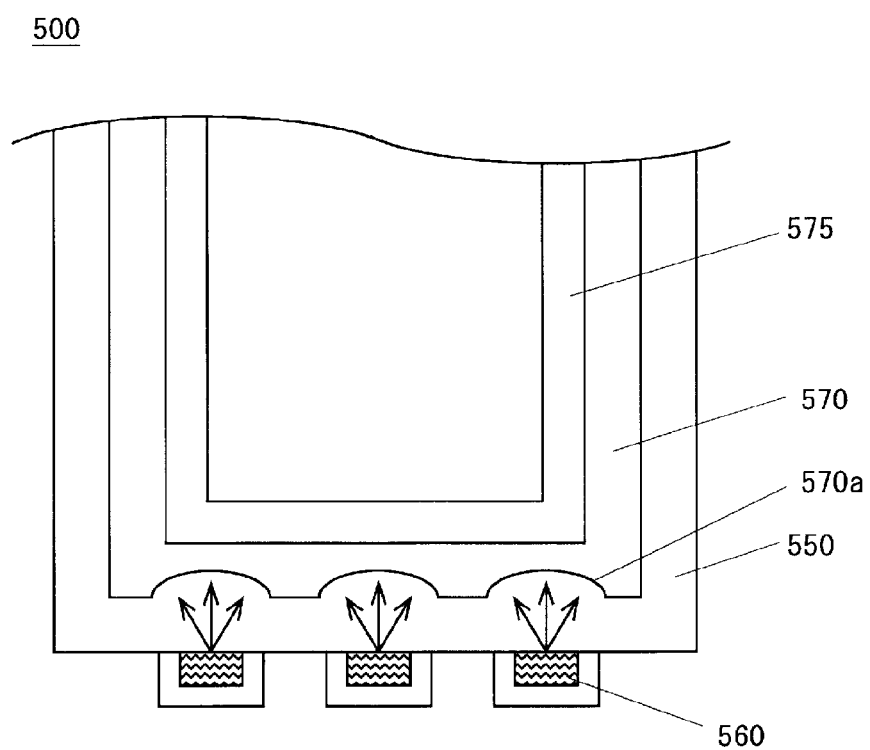
FIG. 16 is a plan view of main parts of a conventional liquid crystal display device.

Next, the reason that unevenness in the brightness of the backlight is reduced will be explained. FIG. 15 is an enlarged view of one part (inside the dotted circle) of the liquid crystal display device 400 shown in FIG. 13. As shown in FIG. 15, the surface area L of the light guide plate 50 between the LED FPC 25 and the optical sheet 75 is covered by the diffusion sheet 470 attached to the surface of the optical sheet 75. By doing this, light that leaks to outside the light guide plate 50 from the surface area L will be irradiated on the liquid crystal display panel 30 after being diffused by the diffusion sheet 470, so unevenness in the brightness of the backlight emitted from the backlight device 440 is reduced. Therefore, the images displayed on the screen will be brighter in all areas regardless of distance from LEDs 60.

The liquid crystal display device 400 differs from the first and second liquid crystal display devices 200 and 300 in that the light emitted from the light guide plate 50 passes through the optical sheet 75 and the diffusion sheet 470 in this order. Thus, the brightness of images displayed on the screen of the liquid crystal display device 400 is lower than the brightness of images displayed on the screen of the first and second liquid crystal display devices 200 and 300. However, the backlight radiated on the rear of the liquid crystal display panel 30 passes through the diffusion sheet 470 immediately beforehand. By doing this, the backlight is radiated having been sufficiently diffused, which reduces unevenness in the brightness even further. Therefore, the brightness of images displayed on the screen can made uniform even further, regardless of distance from the LEDs 60.

<4.3 Effects>

The present embodiment has similar effects as Embodiment 1. The backlight passes straight through the diffusion sheet 470 immediately prior to being radiated on the rear of the liquid crystal display panel 30. By doing this, the backlight emitted from the backlight device 440 is radiated in a sufficiently dispersed state, so unevenness in the brightness is further reduced.

INDUSTRIAL APPLICABILITY

The present invention is suitable for a backlight device of a display device such as an active-matrix liquid crystal display device.

DESCRIPTION OF REFERENCE CHARACTERS

10 liquid crystal module
20 flexible printed circuit substrate (FPC)
25 LED FPC
30 liquid crystal display panel
40 backlight device (illumination device)
50 light guide plate
60 light-emitting diode (LED)
75 optical sheet
90 casing
200, 300, 400 liquid crystal display device
240, 340, 440 backlight device
270, 370, 470 diffusion sheet

The invention claimed is:

1. An illumination device using a light emitted by a light-emitting diode as a light source, comprising:
    a light guide plate that diffuses the light;
    a plurality of light-emitting diodes attached to an end of the light guide plate with spaces between the light-emitting diodes;
    a flexible printed circuit substrate that covers a portion of the light guide plate from an end of the light guide plate;
    an optical sheet that covers the light guide plate from another end of the light guide plate to a location opposing the flexible printed circuit substrate across a space between the optical sheet and the flexible printed circuit substrate; and
    a diffusion sheet placed either above or below the optical sheet,
    wherein a surface area of the light guide plate between the flexible printed circuit substrate and the optical sheet is covered by the diffusion sheet,
    wherein the diffusion sheet is placed below the optical sheet, and
    wherein the diffusion sheet extends from a surface of the light guide plate below the optical sheet to a surface of the light guide plate below the flexible printed circuit substrate, while covering the surface area.

2. A display device provided with the illumination device according to claim 1.

3. An illumination device using a light emitted by a light-emitting diode as a light source, comprising:
    a light guide plate that diffuses the light;
    a plurality of light-emitting diodes attached to an end of the light guide plate with spaces between the light-emitting diodes;
    a flexible printed circuit substrate that covers a portion of the light guide plate from an end of the light guide plate;
    an optical sheet that covers the light guide plate from another end of the light guide plate to a location opposing the flexible printed circuit substrate across a space between the optical sheet and the flexible printed circuit substrate; and
    a diffusion sheet placed either above or below the optical sheet,
    wherein a surface area of the light guide plate between the flexible printed circuit substrate and the optical sheet is covered by the diffusion sheet,
    wherein the diffusion sheet is placed above the optical sheet, and
    wherein the diffusion sheet extends from above the optical sheet to above the flexible printed circuit substrate, while covering the surface area.

4. A display device provided with the illumination device according to claim 3.

* * * * *